United States Patent
Quadflieg et al.

[11] Patent Number: 6,155,613
[45] Date of Patent: Dec. 5, 2000

[54] PIPE JOINT

[75] Inventors: Erich Quadflieg, Krefeld; Christoph Bunsen, Hildon; Thomas Gigowski, Grevenbroich; Friedrich Lenze, Ratingen; Martin Schlüter, Düsseldorf, all of Germany

[73] Assignee: Mannesmann Aktiengesellschaft, Düsseldorf, Germany

[21] Appl. No.: 08/809,206

[22] PCT Filed: Aug. 1, 1995

[86] PCT No.: PCT/DE95/01059

§ 371 Date: Apr. 2, 1997

§ 102(e) Date: Apr. 2, 1997

[87] PCT Pub. No.: WO96/07044

PCT Pub. Date: Mar. 7, 1996

[30] Foreign Application Priority Data

Aug. 29, 1994 [DE] Germany ............ 44 31 377

[51] Int. Cl.[7] ............................................. F16L 25/00
[52] U.S. Cl. .................... 285/334; 285/383; 285/906
[58] Field of Search .................... 285/333, 334, 285/355, 390, 383, 906

[56] References Cited

U.S. PATENT DOCUMENTS

| | | | |
|---|---|---|---|
| 1,909,489 | 5/1933 | Eaton | 285/390 X |
| 2,587,544 | 2/1952 | Sneddon | 285/333 |
| 2,885,225 | 5/1959 | Rollins | 285/334 X |
| 3,079,181 | 2/1963 | Wissel | 285/333 X |
| 3,210,096 | 10/1965 | Wissel | 285/334 |
| 3,917,321 | 11/1975 | Rodgers | 285/334 X |
| 4,346,920 | 8/1982 | Dailey | 285/334 X |
| 4,582,348 | 4/1986 | Dearden et al. | 285/390 X |
| 4,629,222 | 12/1986 | Dearden et al. | 285/334 |
| 4,629,223 | 12/1986 | Dearden et al. | 285/334 |
| 4,688,832 | 8/1987 | Ortloff et al. | 285/334 X |

*Primary Examiner*—Dave W. Arola
*Attorney, Agent, or Firm*—Cohen, Pontani, Lieberman & Pavane

[57] ABSTRACT

A pipe joint with a sleeve element and with a spigot element configured to be threadedly connected together to collectively absorb the load experienced by the joint over the threaded sections of the sleeve and spigot. By suitably selecting the leads and tooth gaps in the sleeve or spigot, it is possible for the guide flank at one thread end to be braced against the load flank at the other thread end thereby effecting maximum bracing at the edges of the thread and decreasing toward the thread center.

17 Claims, 6 Drawing Sheets

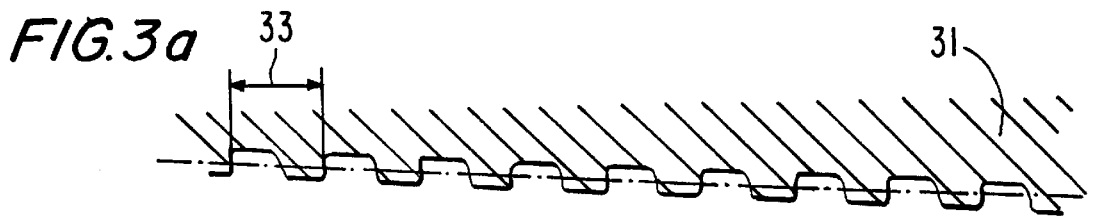
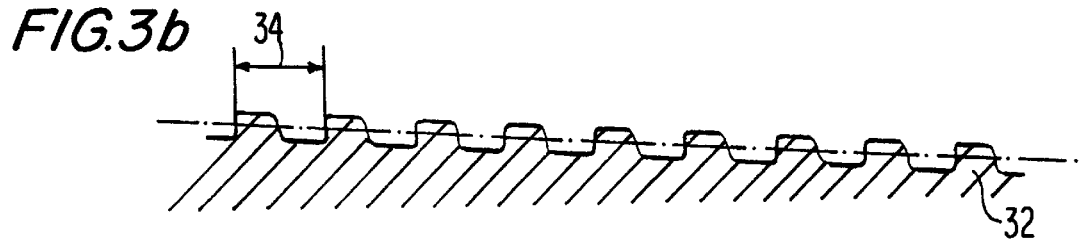
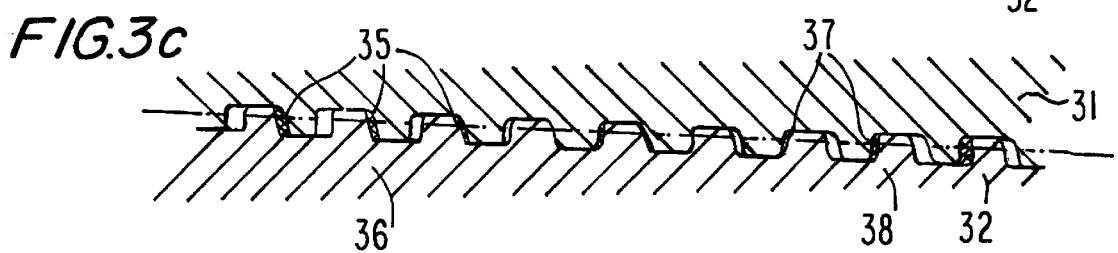
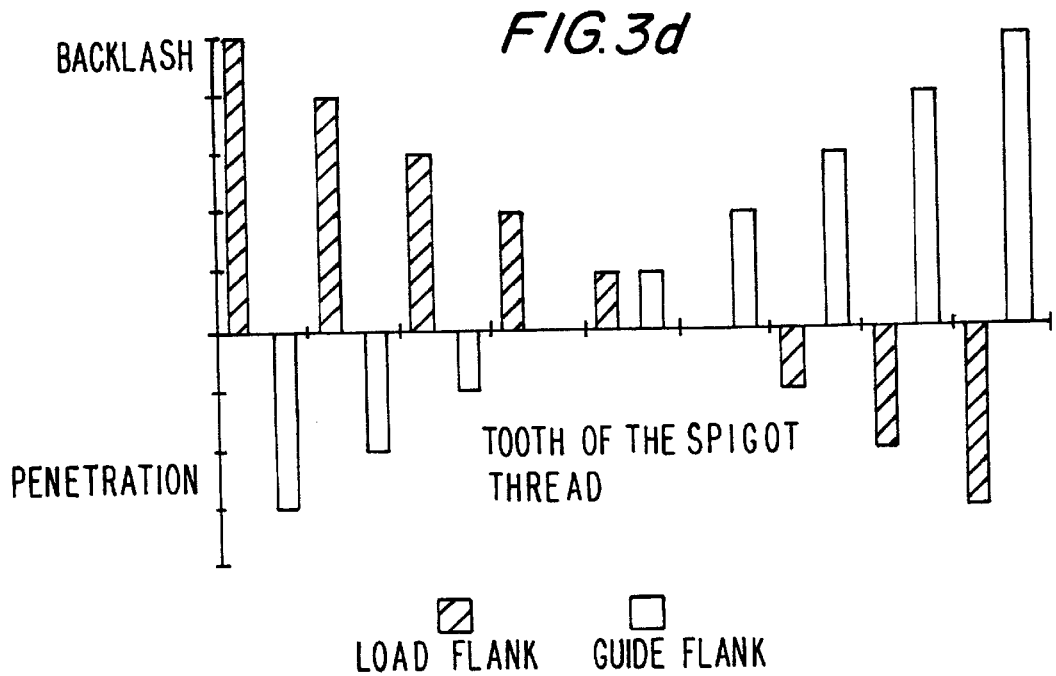

PIPE JOINT

BACKGROUND OF THE INVENTION

1. Field of the Invention

The present invention relates to a pipe joint, and more particularly, to a pipe joint having threaded sleeve and spigot elements which absorb the pipe joint load.

2. Description of the Prior Art

Pipe joints connect tubular elements, for example pipelines, which deliver, in particular, pressurized fluids, such as for example gas or oil. In the search for oil or gas, these pipes are used as casing pipes or delivery pipes.

The pipe connections in question here are usually made using threads, an external thread on a spigot element and an internal thread in a sleeve element, which are screwed together. As far as the definitive positioning after the screwing-together operation is concerned, a distinction is made between pipe joints with an alignment marking and pipes joints which have an additional abutment element such as an inner shoulder or an outer shoulder. This shoulder element may additionally function as a seal. The shoulder essentially comprises annular surfaces which are arranged, for example, at the free end of the spigot element and on the inner side of the sleeve element and are pressed firmly one upon the other by the screwing-together operation. In the case of an inner shoulder, the spigot element is compressed between the shoulder and the thread and the sleeve element is expanded between the shoulder and the thread. In the case of an outer shoulder, the spigot element is expanded between the shoulder and the thread and the sleeve element is compressed between the shoulder and the thread. The sleeve and spigot stressing caused by the contact pressure in the shoulder is predominantly absorbed only by the small number of teeth at the end of the thread which are located adjacent to the shoulder surfaces. The remaining thread teeth are only subjected to an extremely small degree of loading. Accordingly, the loaded thread teeth are highly stressed. This high stressing in the thread is increased by external loading on the connection, in particular by axial tension and/or compression, but also by internal and external pressure and by bending, with the result that the overall stressing can reach a value which is greater than the permissible yield point. Axial tension can eliminate the prestressing in the abutment, and thus the positioning and sealing action thereof, and axial compression can result in plastic deformation in the shoulder region and, in the case of subsequent tensile loading, can render the positioning and feeling functions ineffective.

To distribute the forces acting on the sealing surfaces, i.e. abutment surfaces as reaction forces over the largest possible number of thread teeth, German Patent number DE 34 31 808 A1 discloses a specially designed pipe joint. In this reference, the pipe joint has an intermediate threaded section between the ends of the spigot thread and sleeve thread, in which the two elements have the same lead. In the end sections, the leads of the spigot thread and sleeve thread differ, to be precise in dependence on the position of the abutment:

If the annular sealing surfaces, i.e. abutment surfaces, are located on the inside of the pipe, then the thread of the spigot element has a greater lead than the thread of the sleeve element; if the sealing surface is located on the outside of the pipe, the opposite is true. The proposed arrangement is intended to make it possible for the reaction force originating from the abutment to be transmitted uniformly over the thread teeth. However, loading, such as axial compression and bending, is further introduced largely into the abutment, which is already prestressed to a considerable extent by the elements being screwed together. The pipe joint disclosed in this reference can also be used for a pipe joint with a multiple-start thread.

SUMMARY OF THE INVENTION

It is accordingly an object of the present invention to provide a pipe joint which can be easily produced and by means of which all external loading on the pipe joint connection is absorbed predominantly by the thread. In this case, loading which poses a particular risk for known connection designs with an abutment shoulder, such as axial compression and bending, is absorbed predominantly by the thread, rather than being borne by the abutment alone. A further object of the present invention is to distribute all the loads uniformly over the thread.

In the case of the pipe joint configured according to the present invention, irrespective of whether the thread is a single-start thread or multiple-start thread, one element, preferably the spigot element, has a constant lead extending over the entire threaded length; in the case of multiple-start threads, the spigot element has identical, constant leads. The great advantage of this is that a damaged spigot thread can be recut by relatively simple means.

The design of the sleeve element according to the present invention is such that axial bracing is produced in the thread in the screwed-together position. This may be realized in various ways.

The axial bracing of the thread is produced by different leads in the sleeve thread and spigot thread. These different leads are fixed such that, in the screwed-together position, the load flank in one region of the thread is always braced against the guide flank in another region of the thread. Depending on the design of the leads, the bracing takes place at the edges of the thread or approximately in the central region of the thread.

Multiple-start threads, preferably the double-start threads, play a special role in a pipe joint configured in accordance with the present invention. If one helix of one element has a different lead from the second helix or from the other helixes and from the helixes of the other element, then it is possible to achieve particular types of thread bracing. For this purpose, however, it is not only the different leads which have a decisive influence, but also the position which these helixes assume with respect to one another. Accordingly, when the threads are being cut, it is necessary to take account of a thread-start offset, which the cutting tool must maintain. It is this thread-start offset and the different leads which produce the thread-bracing types found in the present invention. This also applies when more than one helix has a different lead from the remaining helixes.

Common to all the embodiments of the present invention is the essential idea of using a difference in leads to cause the load flank in one thread region to be braced against the guide flank in the same region or in another region. In addition, the threads are designed such that the contour of the thread gaps in all the load-absorbing helixes and regions of one element is the same. This means that a final tool cut provides the thread with its tooth and gap contour appropriate for production. In the case of multiple-start threads, the differences in leads may result in different tooth widths, but the gap width of the thread remains the same. The essential advantage of these identical thread gaps is that the threads can be produced by one cutting tool, and it is not necessary for two tools to be positioned with respect to one another in the lathe. Furthermore, there is no need for a second, finishing cut with precise positioning of the tool in order to produce a desired gap profile.

The present invention does not rule out the use of an abutment as a positioning element or as an additional supporting element for absorbing extreme axial-compression loading or bending. However, even if an abutment is used, axial compression and the compression component of bending are predominantly absorbed by the thread, thus preventing overloading of the abutment shoulder.

The thread may be designed to be cylindrical, conical or inclined in any desired manner. The tooth shape itself is of minor importance.

Uniform loading of the threaded regions means that it is possible for the tooth depth of the thread to be reduced in comparison with conventional pipe joints. By the same token, the overall height of the pipe joint is smaller, which results in an increase in the annular-space cross sections in bores and/or in narrower casings through which the pipes pass. On the other hand, while maintaining the tooth depth, it is possible to increase the capacity for axial compression or bending of the connection, and also to increase the screwing torque. Increased bending capacity and increased screwing torque are particularly advantageous, for example, for the rotary installation or cementing of casing pipes for branched or horizontal bores. This means that the high frictional resistance of the bore wall or of the cement can be overcome without the connections being overloaded or damaged.

BRIEF DESCRIPTION OF THE DRAWINGS

In the drawings:

FIG. 3a is a partial cross-sectional view of a sleeve thread having a constant lead and configured in accordance with the present invention;

FIG. 3b is a partial cross-sectional view of a spigot thread having a smaller lead than the lead of the sleeve thread of FIG. 3a and configured in accordance with the present invention;

FIG. 3c is a partial cross-sectional view of the sleeve thread of FIG. 3a and the spigot thread of FIG. 3b shown in the threaded-together position and illustrating the penetration of the guide flanks and load flanks;

FIG. 3d is a graphical representation of the penetration and backlash characteristics for each tooth of the respective sleeve and spigot threads of FIG. 3c;

DETAILED DESCRIPTION OF THE PRESENTLY PREFERRED EMBODIMENTS

Figure 1:
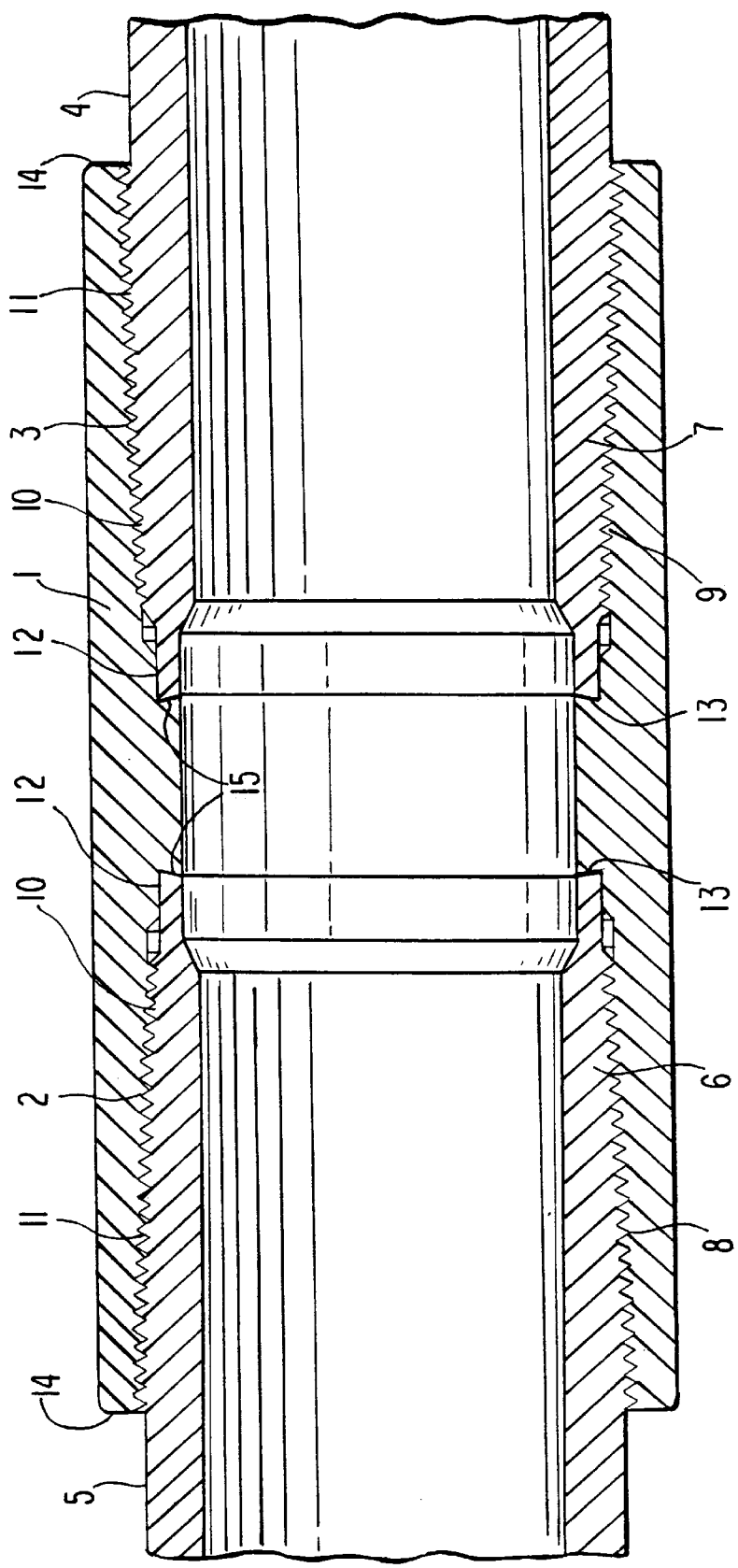
FIG. 1 is a longitudinal cross-sectional view of a pipe joint having a sleeve and configured in accordance with the present invention.
Figure 2:
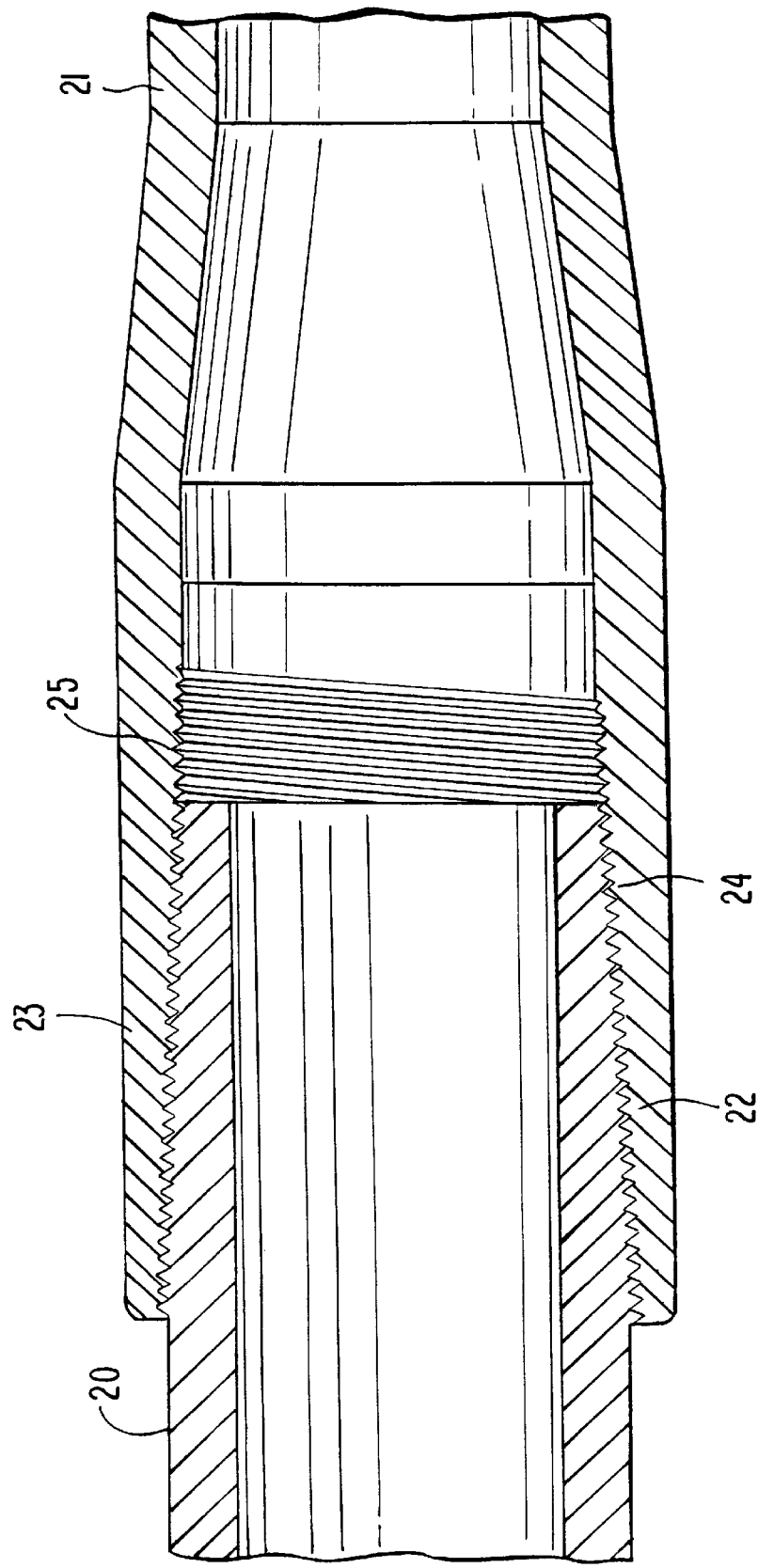
FIG. 2 is a longitudinal cross-sectional view of a pipe joint having an integral connection and configured in accordance with the present invention.

Referring now to the drawings, FIGS. 1 and 2 illustrate pipe joints configured in accordance with the present invention. Specifically, FIG. 1 illustrates a pipe joint with a sleeve and FIG. 2 illustrates a pipe joint in the form of an integral connection. The pipe joint of FIG. 1 comprises a sleeve 1, which is provided with two conically designed threaded sections 2, 3 and, in the central region, has on both sides in each case a sealing seat 12 and an abutment 13. The details of the sealing seat and abutment are not illustrated here since they are not essential to the invention. The two pipes 4, 5 which are to be connected are designed in the end region as a spigot element 6, 7 and have threaded sections 8, 9, which are complementary to the thread of the sleeve 1 and are likewise of conical design. The threaded sections 2 and 3 of the sleeve 1 end at sleeve-face thread ends 11 so that the sections of the internal surface of the sleeve I between the sleeve-faced thread ends 11 and a sleeve end faces 14 at the ends of the sleeve 1 are unthreaded. Similarly, the threaded sections 8 and 9 of the respective pipes 5 and 4 end at spigot-face thread ends 10 so that the sections of the external surface of pipes 4 and 5 between the spigot-face thread ends 10 and the spigot end faces 15 at the ends of the pipes 4 and 5 are unthreaded. In contrast to FIG. 1, the sleeve is dispensed with in the integral connection illustrated in FIG. 2. The two pipes 20, 21 which are to be connected are designed as a spigot element 22 at one end and as a sleeve element 23 at the other end. The two elements 22, 23 each have a threaded section 24, 25 of mutually complementary conical design. The abutment and sealing seat have not been illustrated.

The threaded sections 2, 3 of the sleeve 1 and the threaded sections 8, 9 of the spigot 6, 7 further comprise a plurality of thread teeth (not shown) each having a guide flank and a load flank—the guide flank serving to guide the respective threaded sections 2, 3, 8, 9 during thread-on and thread-off actions between the sleeve 1 and spigot 6, 7, while the load flank bears the load of the joint when the sleeve 1 and the spigot 6, 7 are in the threaded-on position. The threaded sections 2, 3, 8, 9 also include a plurality of thread gaps (not shown) adjacent the plurality of thread teeth. The thread teeth and thread gaps, in combination, define a lead for the threaded sections 2, 3, 8, 9 as the distance between each adjacent combination of thread teeth and thread gaps (See, for example, numeral 505 in FIG. 3). The respective sleeve leads, e.g. 505, 605, 705, and spigot leads, e.g. 506, 608, 708, may be the same or different lengths. In a preferred embodiment, the difference between the sleeve lead and spigot lead is between approximately 0.005 mm/inch and 0.4 mm/inch. The present invention also provides sleeve and spigot element having multiple-start threads, most preferably, double-start threads. Here, the difference between the sleeve lead and spigot lead will be a multiple of between approximately 0.005 mm/inch and 0.4 mm/inch FIGS. 3 to 6 each illustrate longitudinal sections of sleeve threads and spigot threads, in each case in individual illustrations (the sleeve is depicted in FIG. a, the spigot in FIG. b) and in the screwed-together position (FIG. c). The differences in leads which represent the present invention are depicted in a greatly exaggerated manner, illustrate their effect more clearly. In the screwed-together position, instead of the bracing caused by overdimensions, penetrations, i.e. gaps between adjacent load flanks and adjacent guide flanks, are illustrated. The screwed-together position is determined such that the sum of the penetrations of the load flanks is equal to the sum of the penetrations of the guide flanks. In these illustrations, the sleeve and spigot are thus in force equilibrium. External forces and internal friction and non-linearities between bracing and deformation are disregarded in the illustrations. In addition to the longitudinal sections, the bottom parts of the figures (FIG. d) represent the associated penetration and backlash of the flanks in a qualitative manner.

FIG. 3*a* shows a longitudinal section through a sleeve thread 31 with a greater lead 33 than the lead 34 of the spigot thread 32 shown in FIG. 3*b*. FIG. 3*c* shows the penetrations 35 of the guide flanks in the sleeve-face thread end 36 and the penetration 37 of the load flanks in the spigot-face thread end 38. The penetrations are emphasized by cross-hatching, with maximum penetration, i.e. bracing, taking place at the edges of the thread and decreasing toward the center of the thread. The amount of penetration is indicated qualitatively in diagram 3*d*.

Figure 4A:
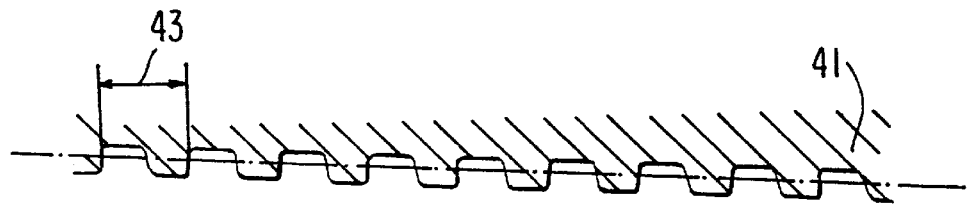
FIG. 4a is a partial cross-sectional view of a sleeve thread having a constant lead and a central lead offset and configured in accordance with the present invention.
Figure 4B:
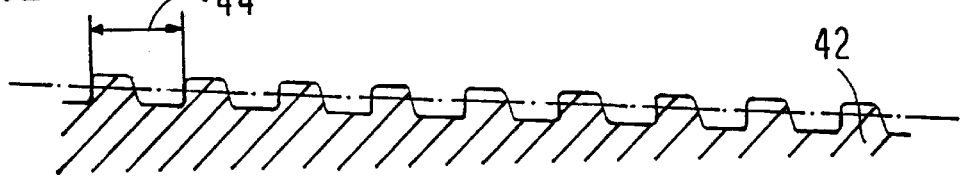
FIG. 4b is a partial cross-sectional view of a spigot thread having a smaller lead than the lead of the sleeve thread of FIG. 4a and configured in accordance with the present invention.

FIG. 4*a* shows a longitudinal section through a sleeve thread 501 having two regions 503, 504 with a greater lead 505 than the lead 506 of the spigot thread 502 shown in FIG. 4*b*. In addition, the sleeve element has a lead offset 507.

Figure 4C:
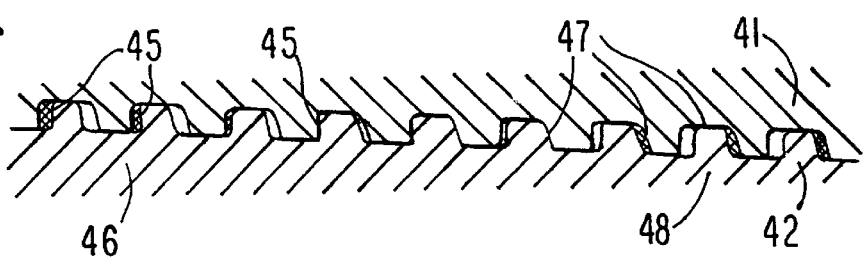
FIG. 4c is a partial cross-sectional view of the sleeve thread of FIG. 4a and the spigot thread of FIG. 4b shown in the threaded-together position and illustrating the penetration of the guide flanks and load flanks.
Figure 4D:
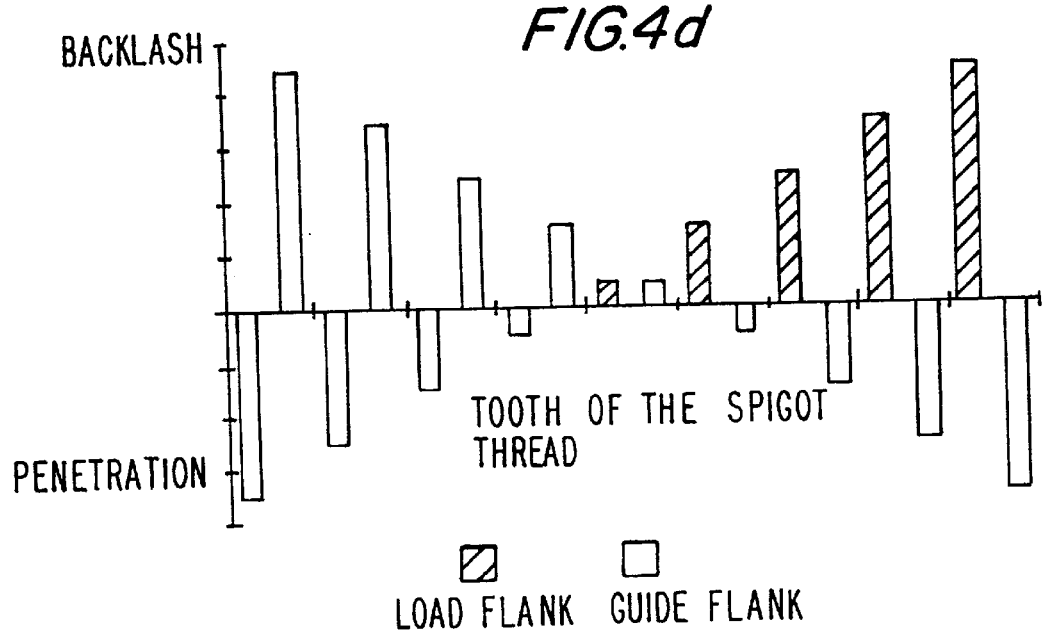
FIG. 4d is a graphical representation of the penetration and backlash characteristics for each tooth of the respective sleeve and spigot threads of FIG. 4c.

FIG. 4*c* shows the penetrations 508 of the load flanks in the threaded region 509 adjacent to the offset on the sleeve-face side and the penetration 510 of the guide flanks in the threaded region 511 adjacent to the offset on the spigot-face side. Once again, the penetrations are emphasized by cross-hatching, with maximum bracing taking place in the center of the thread and decreasing toward the edges of the thread. The amount of penetration is indicated qualitatively in diagram 4*d*.

Figure 5A:
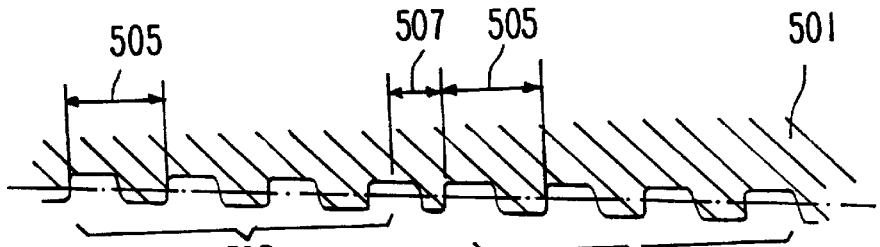
FIG. 5a is a partial cross-sectional view of a double-start sleeve thread having a helix lead larger than the three other helix leads and a thread start offset fixed for progressive load-flank bracing and constant guide-flank bracing, and configured in accordance with the present invention.
Figure 5B:
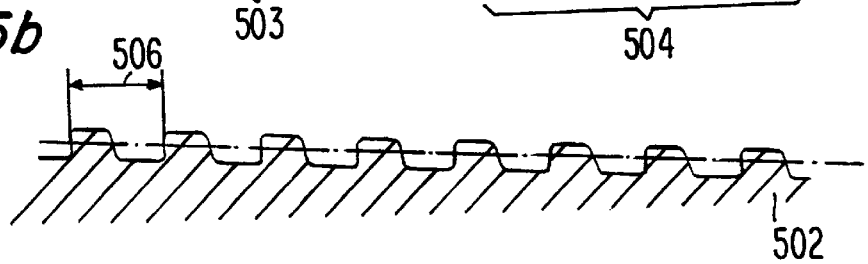
FIG. 5b is a partial cross-sectional view of a double-start spigot thread configured in accordance with the present invention.

FIG. 5*a* shows a longitudinal section through a sleeve thread 601 with two helixes 603, 604, with the first helix 603 having the same lead 605 as the two helixes 606, 607 of the spigot thread 602 with the leads 608, 609 shown in FIG. 5*b*. The second helix 604 of the sleeve thread 601 has a greater lead 610 than the other helixes 603, 606, 607.

Figure 5C:
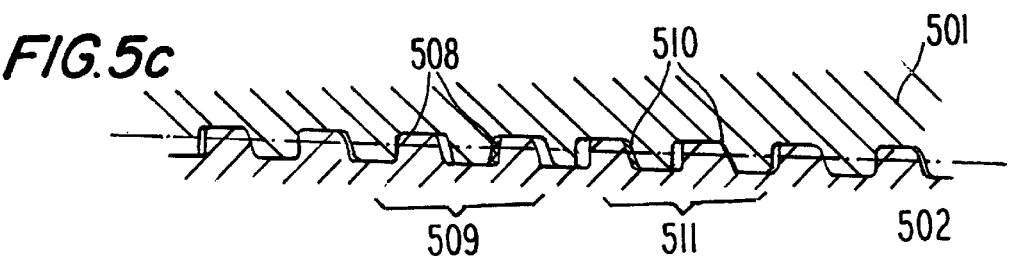
FIG. 5c is a partial cross-sectional view of the sleeve thread of FIG. 5a and the spigot thread of FIG. 5b shown in the threaded-together position and illustrating the penetration of the guide flanks and load flanks.
Figure 5D:
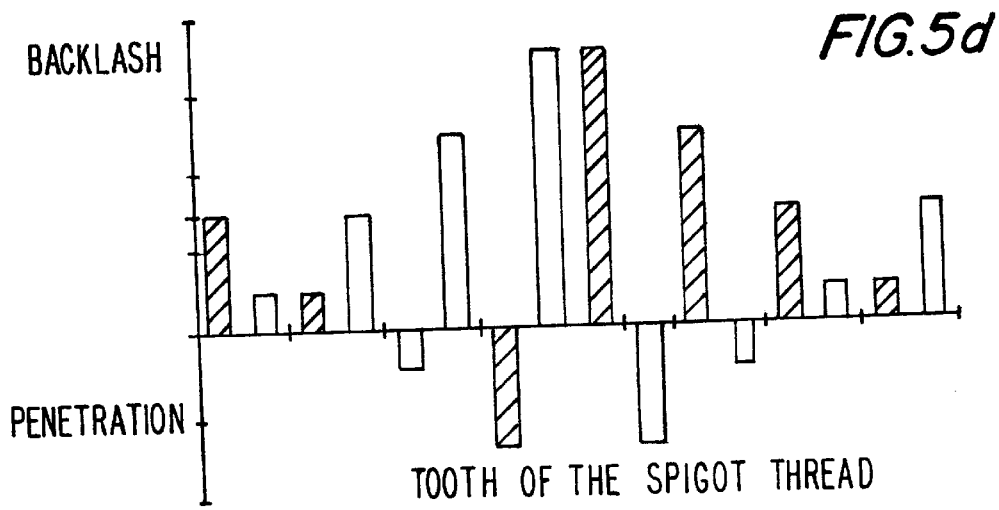
FIG. 5d is a graphical representation of the penetration and backlash characteristics for each tooth of the respective sleeve and spigot threads of FIG. 5c.

The helixes 603, 604 of the sleeve thread 601 have a thread-start offset 611 with respect to one another. FIG. 5*c* shows the penetrations 612 of the guide flanks in the helixes 603, 606, which are constant over the length of the thread, and the load-flank penetrations 614 which increase progressively toward the spigot-face thread end 613. Once again, penetrations are emphasized by cross-hatching. The amount of penetration is indicated qualitatively in diagram 5*d*.

Figure 6A:
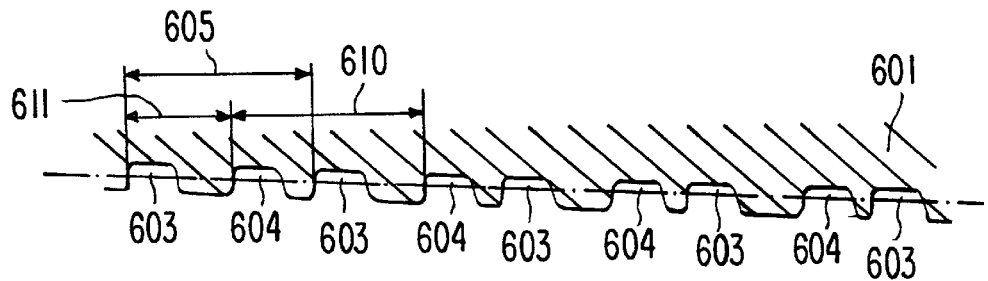
FIG. 6a is a partial cross-sectional view of a double-start sleeve thread having a helix lead larger than the three other helix leads and a thread start offset fixed for progressive guide-flank bracing and constant load-flank bracing, and configured in accordance with the present invention.
Figure 6B:
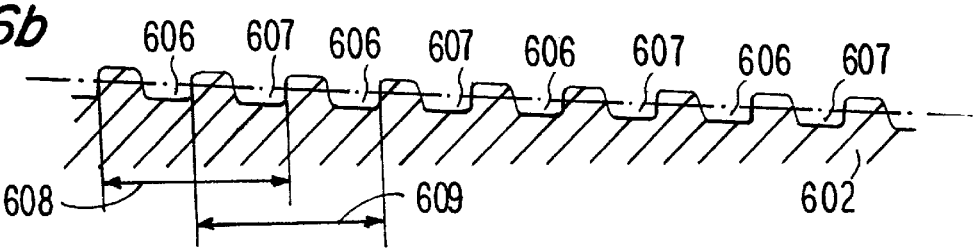
FIG. 6b is a partial cross-sectional view of a double-start spigot thread configured in accordance with the present invention.
Figure 6C:
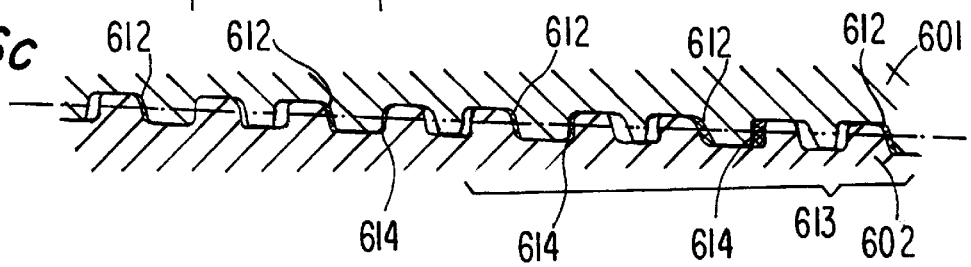
FIG. 6c is a partial cross-sectional view of the sleeve thread of FIG. 6a and the spigot thread of FIG. 6b shown in the threaded-together position and illustrating the penetration of the guide flanks and load flanks.
Figure 6D:
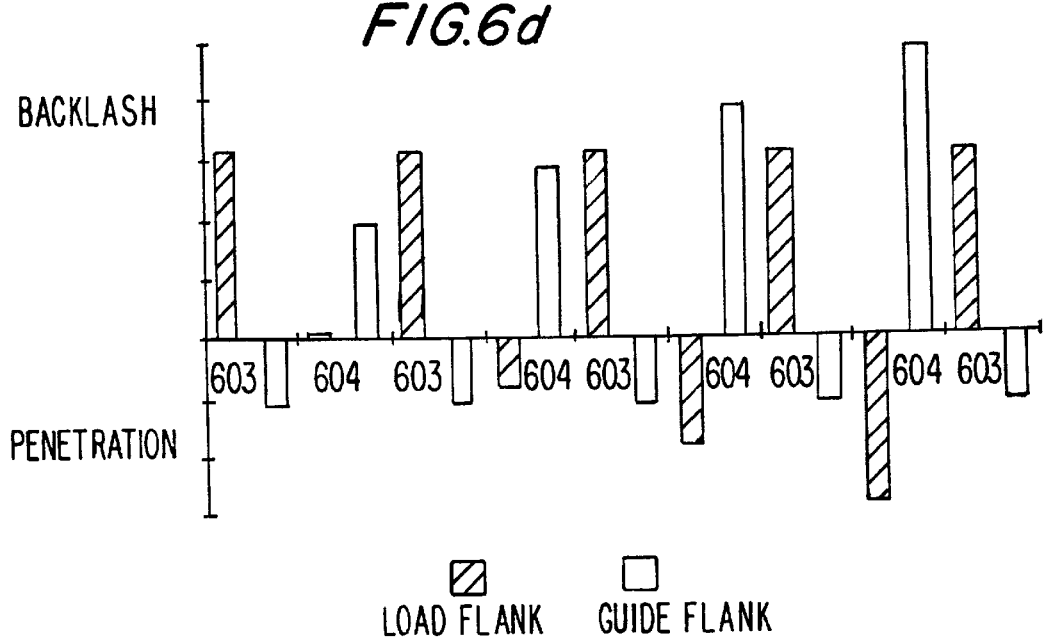
FIG. 6d is a graphical representation of the penetration and backlash characteristics for each tooth of the respective sleeve and spigot threads of FIG. 6c.

Finally, FIG. 6*a* shows a longitudinal section through a sleeve thread 701 with two helixes 703, 704, the helix 703 having the same lead 705 as the helixes 706, 707 of the spigot thread 702 with the leads 708, 709 shown in FIG. 6*b*. The helixes 703, 704 of the sleeve thread 701 have a thread-start offset 711 with respect to one another. FIG. 6*c* shows the penetrations 712 of the load flanks in the helixes 703, 707, which are constant over the length of the thread, and the guide-flank penetrations 714 which increase progressively toward the sleeve-face thread end 713. Once again, the penetrations are emphasized by cross-hatching. Once again, the amount of penetration is indicated qualitatively in diagram 6*d*.

We claim:

1. A pipe joint, comprising:

a sleeve including a sleeve end face and an internal threaded section having sleeve thread teeth, said threaded section terminating at a sleeve thread end position located a first distance from said sleeve end face so that said sleeve has an internal unthreaded section between said end of said sleeve and said sleeve thread end position; and a spigot including a spigot end face and an external threaded section having spigot thread teeth and for threaded engagement with said sleeve thread teeth to provide a threaded connection between said sleeve and spigot for forming said pipe joint, said external threaded section terminating at a spigot thread end position located at a second position from said spigot end face so that said spigot has an external unthreaded section between said end face of said spigot and said spigot thread end position;

said sleeve thread teeth defining guide flanks and load flanks and sleeve thread gaps and a constant first lead between adjacent ones of said guide flanks;

said spigot thread teeth defining guide flanks and load flanks and spigot thread gaps and a constant second lead between adjacent ones of said spigot teeth guide flanks, said second lead being smaller than said first lead by a predetermined difference and said spigot thread gaps being wider than said sleeve thread teeth by approximately said predetermined difference, said spigot guide flanks facing said sleeve guide flanks and said spigot load flanks facing said sleeve load flanks when said sleeve internal threaded section and said spigot external threaded section are threadedly connected to form said pipe joint, wherein said predetermined difference between said first lead and said second lead causes said guide flanks at said sleeve thread end position to be braced against said load flanks at said spigot thread end position to provide maximized bracing proximate terminating ends of said threadedly connected internal and external threaded sections and decreased bracing toward central portions between said terminating ends of said threadedly connected internal and external threaded sections.

2. The pipe joint of claim 1, wherein the predetermined difference between said first lead and said second lead is within a range including 0.005 mm inch to 0.4 mm/inch.

3. The pipe joint of claim 1, wherein said sleeve includes a thread-free inner end face and said spigot includes a thread-free outer end face, said inner end face and said outer end face form an abutment shoulder in said pipe joint when said sleeve and said spigot are threadably connected.

4. A pipe joint, comprising:

a sleeve having a sleeve end face and an internal threaded section comprising first and second parts separated by a lead offset, each of said first and second parts having sleeve thread teeth defining guide flanks and load flanks and sleeve thread gaps and a constant first lead between adjacent ones of said guide flanks, said lead offset comprising one of said sleeve thread teeth and one of said sleeve thread gaps having a different lead from said first lead, said internal threaded section terminating at a sleeve thread end position located a first distance from said sleeve end face so that said sleeve has an internal unthreaded section between said end of said sleeve and said sleeve thread end position; and a spigot having a spigot end face and an external threaded section including spigot thread teeth defining guide flanks and load flanks and a spigot thread gap and a constant second lead between adjacent ones of said spigot teeth guide flanks and being configured to provide a threaded connection between said sleeve and spigot for forming said pipe joint, said external threaded section terminating at a spigot thread end position located at a second position from said spigot end face so that said spigot has an external unthreaded section between said end face of said spigot and said spigot thread end position, and said second lead being different from said first lead by a predetermined difference and the thread gap of one of said sleeve and spigot having a width greater than a width of the other of said sleeve and spigot by said predetermined difference, said spigot guide flanks facing said sleeve guide flanks and said spigot load flanks facing said sleeve load flanks when said sleeve internal threaded section and said spigot external threaded section are threadedly connected to form said pipe joint and said one of said sleeve thread teeth of said lead offset is disposed within one of said spigot thread gaps in a noncontact manner to define a substantial gap between said lead offset and said one of said spigot thread gap, said lead offset being operatively sized such that ones of the load flanks disposed adjacent said lead offset on said sleeve thread end position side of said lead offset are braced axially against ones of the guide flanks disposed adjacent said lead offset on said spigot thread end position side of said lead offset, said predetermined difference between said first lead and said second lead providing maximum bracing at central portions of said internal and external threaded sections adjacent said lead offset and decreased bracing at said terminating ends of said internal and external threaded sections.

5. The pipe joint of claim 4, wherein said internal threaded section and said external threaded section comprise double-start threads.

6. A pipe joint, comprising, a sleeve comprising, a sleeve end face and a double-start internal threaded section defining a first helix and a second helix, each of said first helix and said second helix including helix thread teeth defining guide flanks and load flanks and helix thread gaps said first helix having a first constant lead between adjacent guide flanks and said second helix having a second constant lead between adjacent guide flanks; and a spigot comprising a spigot end face and a double-start external threaded section defining a third helix and a fourth helix, each of said third helix and said fourth helix including helix thread teeth including guide flanks and load flanks and helix thread gaps and third and fourth constant leads between adjacent ones of said guide flanks of said respective third and fourth helices, said first helix guide flanks facing said third helix guide flanks, said first helix load flanks facing said third helix load flanks, said second helix guide flanks facing said fourth helix guide flanks and said second helix load flanks facing said fourth helix load flanks when said double-start internal threaded section and said double-start external threaded section are threadably connected for forming said pipe joint;

wherein one of said first and second helix constant leads is greater than said respective one of said third and fourth constant leads and wherein the other of said first and second constant leads is substantially equal to the other of the respective third and fourth constant leads so that, when said sleeve and said spigot are threadedly connected, said load flanks of each of said sleeve and spigot and said guide flanks the other of said each of said sleeve and spigot are braced against one another.

7. The pipe joint of claim 6, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end position on said spigot so that said spigot has an internal unthreaded section between said end of said spigot and said spigot thread end position, and wherein said helix thread teeth of each of said first helix and said second helix begin at a fixed location located so that said load flanks of one of said first and said second helix are braced progressively toward said spigot thread end position against said guide flanks of the other of said first and said second helix, said guide flanks being braced lengthwise uniformly over said internal and external threaded sections.

8. The pipe joint of claim 7, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end on said spigot so that said spigot has an external unthreaded section between said end face of said spigot and said spigot thread end position, and wherein said helix thread teeth of each of said first helix and said second helix begin at a fixed location located so that said guide flanks of one of said first and said second helix are braced toward said sleeve thread end position against said load flanks of said one of said first and said second helix at said spigot-face thread end.

9. The pipe joint of claim 6, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end on said spigot, and wherein said helix thread teeth of each of said first helix and said second helix begin at a fixed location located so that said guide flanks of one of said first and said second helix are braced toward said sleeve thread end position against said load flanks of the other of said first and said second helix, said load flanks being braced lengthwise uniformly over said internal and external threaded sections.

10. A pipe joint comprising:
a sleeve comprising sleeve end face and a double-start internal threaded section defining a first helix and a second helix, each of said first helix and said second helix including helix thread teeth defining guide flanks and load flanks and helix thread gaps said first helix having a first constant lead between adjacent guide flanks and said second helix having a second constant lead between adjacent guide flanks; and
a spigot comprising a spigot end face and a double-start external threaded section defining a third helix and a fourth helix, each of said third helix and said fourth helix including helix thread teeth including guide flanks and load flanks and helix thread gaps and third and fourth constant leads for respective ones of said third helix and said fourth helix, said first helix guide flanks facing said third helix guide flanks, said first helix load flanks facing said third helix load flanks, said second helix guide flanks facing said fourth helix guide flanks and said second helix load flanks facing said fourth helix load flanks when said double-start internal threaded section and said double-start external threaded section are threadably connected;
wherein one of said first constant lead and said second constant lead is smaller than the respective one of said third and fourth constant leads of said third and said fourth helix and wherein the other of said first and second constant leads is substantially equal to said respective one of said third and said fourth helix so that, when said sleeve and said spigot are threadedly connected, said load flanks of each of said sleeve and spigot and said guide flanks of the other of said each of said sleeve and spigot are braced against one another.

11. The pipe joint of claim 10, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a thread end position on said spigot so that said spigot has an external unthreaded section between said end face of said spigot and said spigot thread end position, and wherein said helix thread teeth of each of said first helix and said second helix begin at a fixed location located so that said load flanks of one of said first and said second helix are braced toward said sleeve thread end position against said guide flanks of the other of said first and said second helix, said guide flanks being braced lengthwise uniformly over said internal and external threaded sections.

12. The pipe joint of claim 10, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end position on said spigot so that said spigot has an external unthreaded section between said end face of said spigot and said spigot thread end position, and wherein said helix thread teeth of each of said first helix and said second helix begin at a fixed location located so that said load flanks of one of said first and said second helix are braced toward said sleeve thread end position against said guide flanks of said one of said first and said second helix.

13. The pipe joint of claim 10, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end position on said spigot so that said spigot has an external unthreaded section between said end face of said spigot and said spigot thread end position, and wherein said helix thread teeth of each of said first helix and said second helix begin at a fixed location located so that said guide flanks of one of said first and said second helix are braced with progressively increasing force toward said spigot thread end position against said guide flanks of said other one of said first and said second helix, said guide flanks of the other of said first and said second helix being braced lengthwise uniformly over said internal and external threaded sections.

14. A pipe joint, comprising:
a sleeve comprising a sleeve end face and a double-start internal threaded section defining a first helix and a second helix, each of said first helix and said second helix including helix thread teeth defining guide flanks and load flanks and helix thread gaps said first helix having a first constant lead between adjacent guide flanks and said second helix having a second constant lead between adjacent guide flanks; and
a spigot comprising a spigot end face and a double-start external threaded section defining a third helix and a fourth helix, each of said third helix and said fourth helix including helix thread teeth including guide flanks and load flanks and helix thread gaps and third and fourth constant leads for said respective third helix and said fourth helix, said first helix guide flanks facing said third helix guide flanks, said first helix load flanks facing said third helix load flanks, said second helix guide flanks facing said fourth helix guide flanks and said second helix load flanks facing said fourth helix load flanks when said double-start internal threaded section and said double-start external threaded section are threadably connected;
wherein one of said first constant lead and said second constant lead is greater than the respective one of said third and said fourth constant leads and the other of said first and said second constant leads is smaller than the constant lead of the respective one of said third and said fourth helix so that when said sleeve and said spigot are threadedly connected, said load flanks and said guide flanks are braced against one another.

15. The pipe joint of claim 14, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end position on said spigot so that said spigot has an external unthreaded section between said end face of said spigot and said spigot thread end position, and wherein said helix thread teeth of each of said first helix and said second helix begin at a fixed location located so that said guide flanks of one of said first and said second helix are braced toward said sleeve thread end position against said load flanks of the other of said first and said second helix, which are braced with progressively increasing force toward said sleeve thread end position.

16. The pipe joint of claim 14, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end position on said spigot so that said spigot has an external unthreaded section between said end face of said spigot and said spigot thread end position, and wherein said helix thread teeth of each of said first helix and said second helix begin at a fixed location located so that said guide flanks of one of said first and said second helix are braced toward said sleeve thread end position and said guide flanks of the other of said first and said second helix are braced toward said spigot thread end position against said load flanks of said one of said first and said second helix toward said sleeve thread end position.

17. The pipe joint of claim 14, wherein said internal threaded section of said sleeve terminates at a sleeve thread end position on said sleeve so that said sleeve has an internal unthreaded section between said end of said sleeve and said sleeve thread end position and wherein said external threaded section of said spigot terminates at a spigot thread end position on said spigot so that said spigot has an external unthreaded section between said end face of said spigot and said spigot thread end position, and wherein said helix thread teeth of said first helix and said second helix begin at a fixed location located so that said guide flanks of one of said first and said second helix are braced with progressively increasing force toward said spigot thread end position.

* * * * *